United States Patent
Li et al.

(10) Patent No.: US 12,382,323 B2
(45) Date of Patent: Aug. 5, 2025

(54) TERMINAL, BASE STATION, AND METHOD FOR TRANSFORMING A MEASUREMENT CONFIGURATION

(71) Applicant: Apple Inc., Cupertino, CA (US)

(72) Inventors: Qiming Li, Beijing (CN); Dawei Zhang, Saratoga, CA (US); Huaning Niu, San Jose, CA (US); Jie Cui, San Jose, CA (US); Manasa Raghavan, Sunnyvale, CA (US); Xiang Chen, Campbell, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/906,707

(22) PCT Filed: Sep. 24, 2021

(86) PCT No.: PCT/CN2021/120252
§ 371 (c)(1),
(2) Date: Sep. 19, 2022

(87) PCT Pub. No.: WO2023/044732
PCT Pub. Date: Mar. 30, 2023

(65) Prior Publication Data
US 2024/0236725 A1   Jul. 11, 2024

(51) Int. Cl.
*H04W 24/08* (2009.01)

(52) U.S. Cl.
CPC .................. *H04W 24/08* (2013.01)

(58) Field of Classification Search
CPC ...... H04W 24/00; H04W 24/08; H04W 24/10
See application file for complete search history.

(56) References Cited

U.S. PATENT DOCUMENTS

| 2024/0080694 A1* | 3/2024 | Yang ................. H04W 36/0088 |
| 2024/0098539 A1* | 3/2024 | Huang .............. H04W 56/0015 |

(Continued)

FOREIGN PATENT DOCUMENTS

| CN | 108702305 A | 10/2018 | |
| WO | WO-2018144584 A1 * | 8/2018 | ............ H04W 24/10 |
| WO | 2020172651 A1 | 8/2020 | |

OTHER PUBLICATIONS

Apple, "Email discussion summary for [100-e][225] NR_MG_enh_3," 3GPP TSG-RAN WG4 Meeting #100-e, R4-2115215, Aug. 20, 2021.

(Continued)

*Primary Examiner* — Robert C Scheibel
(74) *Attorney, Agent, or Firm* — Blank Rome LLP

(57) ABSTRACT

A terminal may include a transmitter that transmits, to a base station, a terminal capability indicating support for a first type of measurement configuration or a second type of measurement configuration. The terminal may include a receiver that receives, from the base station, network configuration information representative of a mapping between the first type of measurement configuration and the second type of measurement configuration. The terminal may include a processor that, based on the mapping, transforms the first type of measurement configuration to the second type of measurement configuration or transforms the second type of measurement configuration to the first type of measurement configuration. The network configuration information may be based on an independent frequency range (FR) measurement and a network preference included in the terminal capability.

20 Claims, 11 Drawing Sheets

(56) References Cited

U.S. PATENT DOCUMENTS

2024/0236750 A1* 7/2024 Hu .................... H04W 76/15
2024/0373305 A1* 11/2024 Tang ................ H04W 36/0088

OTHER PUBLICATIONS

International Search Report received in PCT Application No. PCT/CN2021/120252, mailed May 30, 2022.

Vivo, "Issues on measurement gap in EN-DC and NR," 3GPP TSG-RAN WG2 Meeting #100, R2-1712765, Nov. 17, 2017.

3GPP TSG-RAN WG4 Meeting # 100-e, Electronic Meeting, Aug. 16-27, 2021, Apple, Email discussion summary for [100-e][225] NR_MG_enh_3, R4-2115215, 46 pages.

* cited by examiner

TERMINAL, BASE STATION, AND METHOD FOR TRANSFORMING A MEASUREMENT CONFIGURATION

FIELD

The present application relates to wireless devices and wireless networks, including devices, circuits, and methods for transforming a measurement configuration between two types of measurement configuration.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), and BLUETOOTH™, among others.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including the fifth generation (5G) standard and New Radio (NR) communication technologies. Accordingly, improvements in the field in support of such development and design are desired.

SUMMARY

According to one or more embodiments, a terminal includes a transmitter that transmits, to a base station, a terminal capability indicating support for a first type of measurement configuration or a second type of measurement configuration. The terminal includes a receiver that receives, from the base station, network configuration information representative of a mapping between the first type of measurement configuration and the second type of measurement configuration. The terminal includes a processor that, based on the mapping, transforms the first type of measurement configuration to the second type of measurement configuration or transforms the second type of measurement configuration to the first type of measurement configuration. The network configuration information is based on an independent frequency range (FR) measurement and a network preference included in the terminal capability.

According to one or more embodiments, a base station includes a receiver that receives, from a terminal, a terminal capability indicating support for a first measurement configuration or a second type of measurement configuration. The base station includes a processor that determines network configuration information representative of a mapping between the first type of measurement configuration and the second type of measurement configuration. The base station includes a transmitter that transmits, to the terminal, the network configuration information indicating to the terminal to transform, based on the mapping, the first type of measurement configuration to the second type of measurement configuration or to transform the second type of measurement configuration to the first type of measurement configuration. The network configuration information is based on an independent frequency range (FR) measurement and a network preference included in the terminal capability.

According to one or more embodiments, a method includes transmitting, from a terminal to a base station, a terminal capability indicating support for a first type of measurement configuration or a second type of measurement configuration. The method includes receiving, in the terminal from the base station, network configuration information representative of a mapping between the first type of measurement configuration and the second type of measurement configuration. The method includes transforming, based on the mapping, the first type of measurement configuration to the second type of measurement configuration or transforms the second type of measurement configuration to the first type of measurement configuration. The network configuration information is based on an independent frequency range (FR) measurement and a network preference included in the terminal capability.

The techniques described herein may be implemented in and/or used with a number of different types of devices, including but not limited to cellular phones, wireless devices, wireless base stations, tablet computers, wearable computing devices, portable media players, and any of various other computing devices.

This Summary is intended to provide a brief overview of some of the subject matter described in this document. Accordingly, it will be appreciated that the above-described features are non-limiting examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter may be obtained when the following detailed description of various aspects is considered in conjunction with the following drawings.

Figure 1:
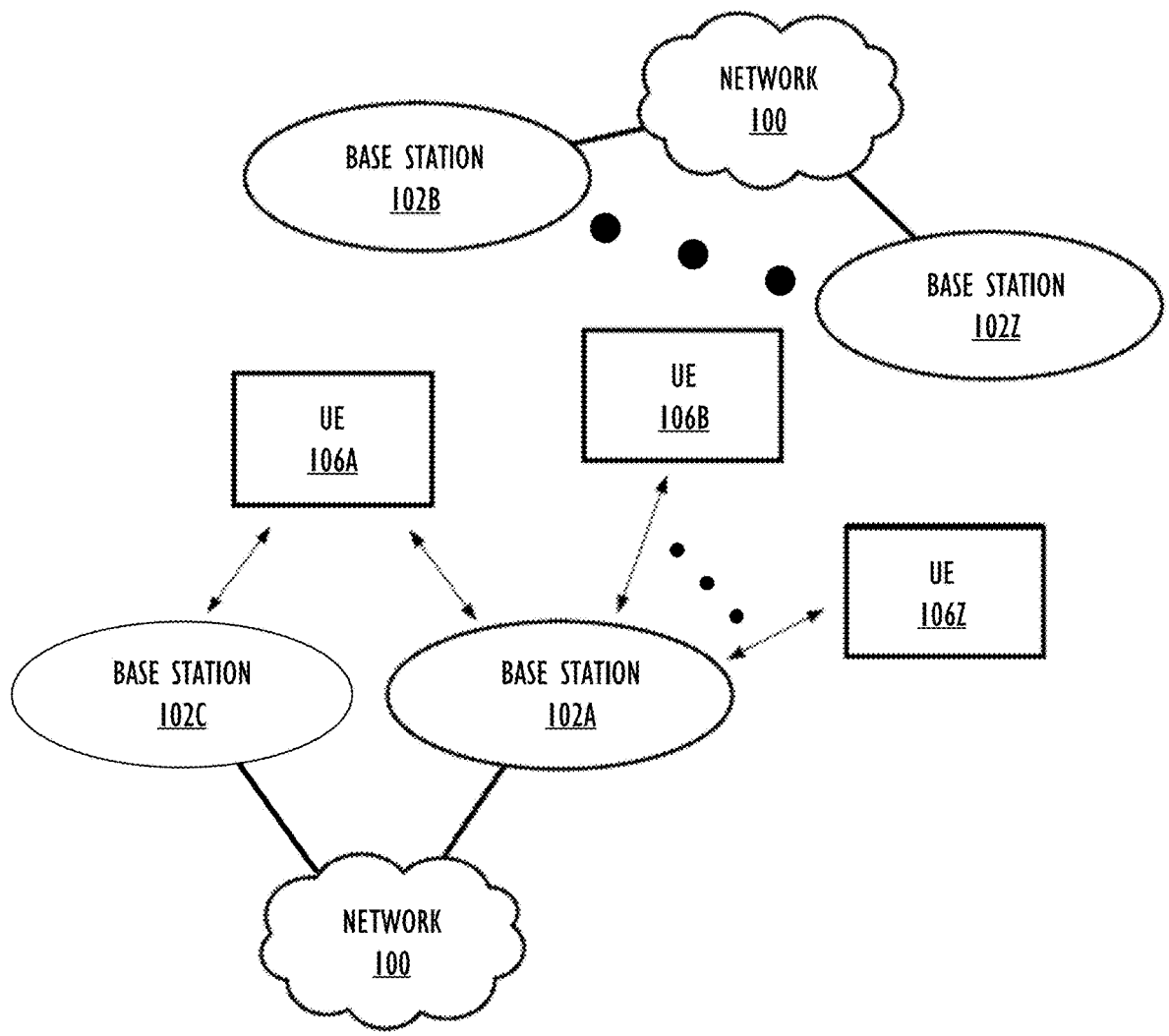
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In accordance to one or more embodiments, a UE device or terminal communicating with multiple base stations performs measurements for one or more neighboring cells and surrounding carrier components. The terminal may measure signals from a device while the device is exchanging signals with the terminal. The terminal may configure a measurement frequency to measure specific neighboring cells and other carrier components operating at different frequencies (e.g., inter-frequency neighbors). The terminal may configure the measurement frequency for connected devices connected to the terminal through multiple radio access technologies (RATs) (i.e., LTE-A and 5G NR). This measurement frequency configuration or measurement configuration is referred to in Releases 15 and 16 of the 3GPP standard as Measurement Gap (MG) configuration.

In some embodiments, terminals, base stations, and methods described herein provide techniques for transforming the MG configuration (hereinafter referred to as "measurement configuration") between two configuration types. In some embodiments, these configuration types may include a first type of measurement configuration and a second type of measurement configuration. The first type of measurement configuration may be a legacy configuration type. The second type of measurement configuration may be a new configuration type. The legacy configuration type may be a configuration set up to perform measurements of a cell in an LTE/LTE-A network and the new configuration type may be another configuration set up to perform measurements of another cell in an 5G NR network. In some embodiments, the legacy configuration type and the new configuration type may be different configurations to measure communication signals from two cells in a same network.

The following is a glossary of terms that may be used in this disclosure:

Memory Medium—Any of various types of non-transitory memory devices or storage devices. The term "memory medium" is intended to include an installation medium, (e.g., a CD-ROM, floppy disks, or tape device: a computer system memory or random access memory such as DRAM, DDR RAM, SRAM, EDO RAM, Rambus RAM), a non-volatile memory such as a Flash, magnetic media (e.g., a hard drive, or optical storage: registers, or other similar types of memory elements). The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations (e.g., in different computer systems that are connected over a network). The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (also "User Device," "UE Device," or "Terminal")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IOT) devices, and the like. In general, the terms "UE" or "UE device" or "user device" may be broadly defined to encompass any electronic, computing, and/or telecommunications device (or combination of devices) that is easily transported by a user (or vehicle) and capable of wireless communication.

Wireless Device—any of various types of computer systems or devices that perform wireless communications. A wireless device may be portable (or mobile) or may be stationary or fixed at a certain location. A UE is an example of a wireless device.

Communication Device—any of various types of computer systems or devices that perform communications, where the communications may be wired or wireless. A communication device may be portable (or mobile) or may be stationary or fixed at a certain location. A wireless device is an example of a communication device. A UE is another example of a communication device.

Base Station—The terms "base station," "wireless base station," or "wireless station" have the full breadth of their ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," and the like, may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," and the like, are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an Application Specific Integrated Circuit (ASIC), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, and the like). For example, LTE may support scalable channel bandwidths from 1.4 MHz to 20 MHz. WLAN channels may be 22 MHz wide while Bluetooth channels may be 1 Mhz wide. Other protocols and standards may include different definitions of channels. Furthermore, some standards may define and use multiple types of channels (e.g., different channels for uplink or downlink and/or different channels for different uses such as data, control information, and the like).

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, and the like), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user (i.e., are not performed "manually", where the user specifies each action to perform). For example, a user filling out an electronic form by selecting each field and providing input specifying information (e.g., by typing information, selecting check boxes, radio selections, and the like) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form but not be involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired, or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner (e.g., by time multiplexing of execution threads).

Configured to—Various components may be described as "configured to" perform a task or tasks. In such contexts, "configured to" is a broad recitation generally meaning "having structure that" performs the task or tasks during operation. As such, the component may be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component may be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is a non-limiting example of a possible system, and that features of this disclosure may be implemented in any of various systems, as desired.

As shown, the example wireless communication system includes a base station 102A, which communicates over a transmission medium with one or more user devices 106A and 106B, through 106Z. Each of the user devices may be referred to herein as a "user equipment" (UE). Thus, the user devices 106 are referred to as UEs or UE devices.

The base station (BS) 102A may be a base transceiver station (BTS) or cell site (e.g., a "cellular base station") and may include hardware that enables wireless communication with the UEs 106A through 106Z.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-A, 5G NR, HSPA, 3GPP2 CDMA2000. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some aspects, the UEs 106 may be IoT UEs, which may comprise a network access layer designed for low-power IoT applications utilizing short-lived UE connections. An IoT UE may utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, and the like) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a Physical Sidelink Shared Channel (PSSCH), a Physical Sidelink Control Channel (PSCCH), a Physical Sidelink Broadcast Channel (PSBCH), and a Physical Sidelink Feedback Channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHZ Intelligent Transport Systems (ITS) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B through 102N) operating according to the same or a different cellular communication standard may thus be provided as a network of cells, which may provide continuous or nearly continuous overlapping service to UEs 106A-106Z and similar devices over a geographic area via one or more cellular communication standards.

Thus, while base station 102A may act as a "serving cell" for UEs 106A-106Z as illustrated in FIG. 1, each UE 106 may also be capable of receiving signals from (and possibly within communication range of) one or more other cells (which may be provided by base stations 102B-102Z and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A and 102B illustrated in FIG. 1 may be macro cells, while base station 102Z may be a micro cell. Other configurations are also possible.

In some aspects, base station 102A may be a next generation base station, (e.g., a 5G New Radio (5G NR) base station, or "gNB"). In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, and the like) in addition to at least one of the cellular communication protocol discussed in the definitions above. The UE 106 may also or alternatively be configured to communicate using one or more global navigational satellite systems (GNSS) (e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
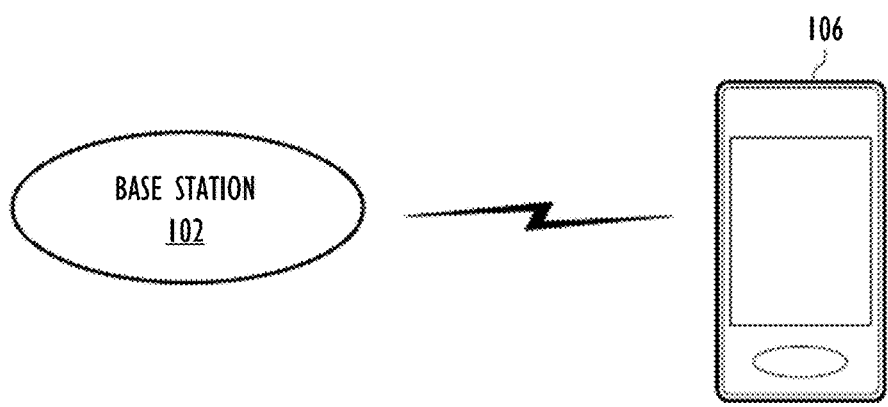
FIG. 2 illustrates a base station (BS) in communication with a user equipment (UE) device, according to some aspects.

FIG. 2 illustrates user equipment 106 (e.g., one of the devices 106A through 106Z) in communication with a base station 102, according to some aspects. The UE 106 may be a device with cellular communication capability such as a mobile phone, a hand-held device, a computer, a laptop, a tablet, a smart watch, or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for a multiple-input multiple output (MIMO) configuration) for performing wireless communications. In general, a radio may include any combination of a baseband processor, analog RF signal processing circuitry (e.g., including filters, mixers, oscillators, amplifiers, and the like), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1xRTT, or either of LTE or GSM, among various possibilities), and separate radios for communicating using each of Wi-Fi and Bluetooth. Other configurations are also possible.

In some aspects, a downlink resource grid may be used for downlink transmissions from any of the base stations 102 to the UEs 106, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the Downlink Control Information (DCI) and the channel condition. There may be four or more different PDCCH formats defined in LTE with different numbers of CCEs (e.g., aggregation level, L=1, 2, 4, or 8).

Example Communication Device

Figure 3:
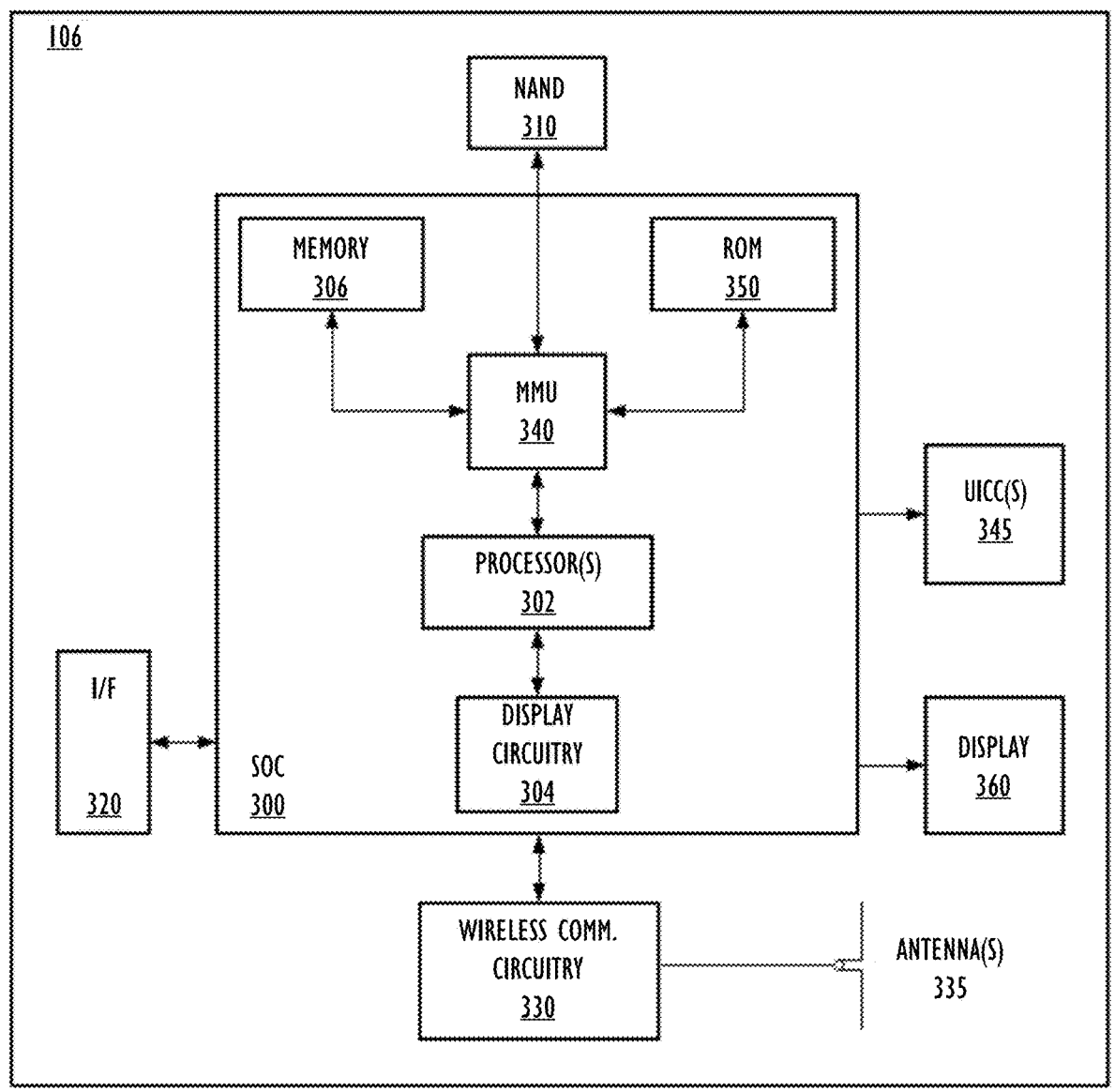
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a UE device or terminal, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system: dock: charging station: input devices, such as a microphone, camera, keyboard: output devices, such as speakers: and the like), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, and the like). In some aspects, communication device 106 may include wired communication circuitry (not shown), such as a network interface card (e.g., for Ethernet connection).

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a MIMO configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT (e.g., LTE) and may be in communication with a dedicated receive chain and a transmit chain shared with a second radio. The second radio may be dedicated to a second RAT (e.g., 5G NR) and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include Subscriber Identity Module (SIM) functionality, such as one or more Universal Integrated Circuit Card(s) (UICC(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein (e.g., by executing program instructions stored on a memory medium). Alternatively (or in addition), processor 302 may be configured as a programmable hardware element, such as a Field Programmable Gate Array (FPGA), or as an Application Specific Integrated Circuit (ASIC). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, and the like) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, and the like) configured to perform the functions of wireless communication circuitry 330.

Example Base Station

Figure 4:
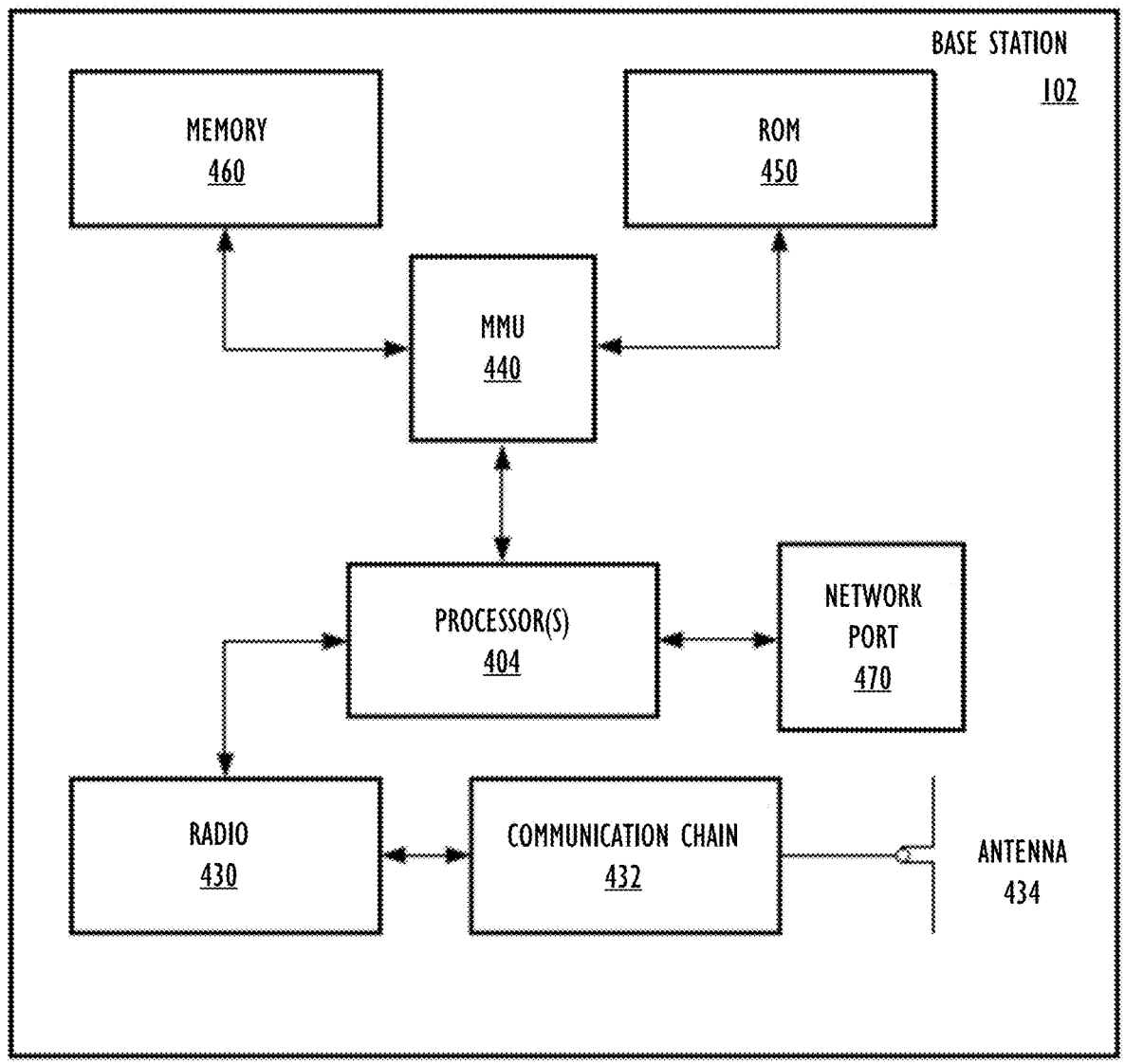
FIG. 4 illustrates an example block diagram of a BS, according to some aspects.

FIG. 4 illustrates an example block diagram of a base station 102, according to some aspects. It is noted that the base station of FIG. 4 is a non-limiting example of a possible base station. As shown, the base station 102 may include processor(s) 404 which may execute program instructions for the base station 102. The processor(s) 404 may also be coupled to memory management unit (MMU) 440, which may be configured to receive addresses from the processor (s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, (e.g., a 5G New Radio (5G NR) base station, or "gNB"). In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including 5G NR, LTE, LTE-A, GSM, UMTS, CDMA2000, Wi-Fi, and the like.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, and the like).

Further, the BS 102 may include hardware and software components for implementing or supporting implementation of features described herein. The processor 404 of the base station 102 may be configured to implement or support implementation of part or all of the methods described herein (e.g., by executing program instructions stored on a memory medium). Alternatively, the processor 404 may be configured as a programmable hardware element, such as a Field Programmable Gate Array (FPGA), or as an Application Specific Integrated Circuit (ASIC), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, and the like) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, and the like) configured to perform the functions of radio 430.

Example Cellular Communication Circuitry

Figure 5:
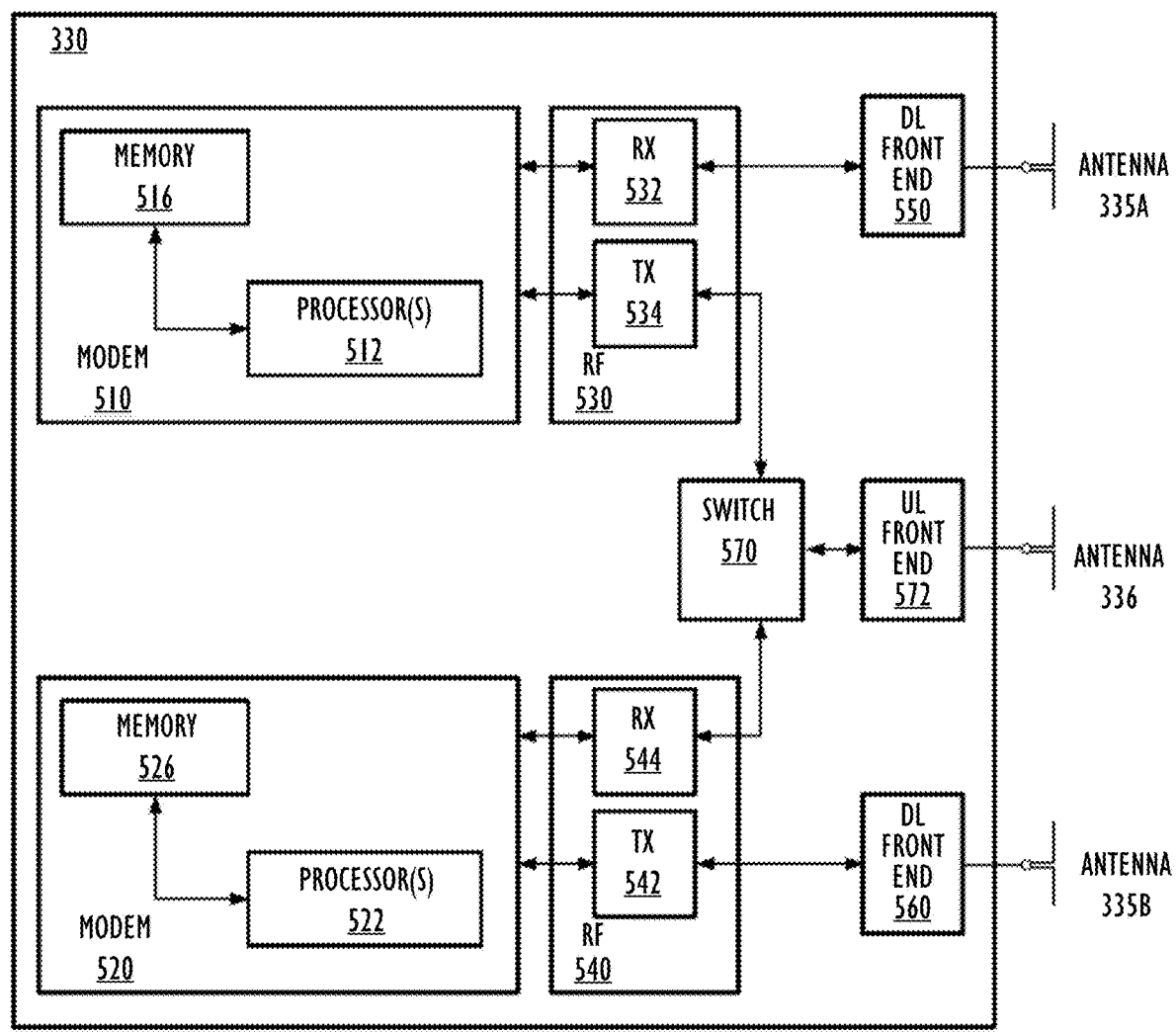
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas (e.g., that may be shared among multiple RATs) are also possible. According to some aspects, cellular communication circuitry 330 may be included in a communication device, such as communication device 106 described above. As noted above, communication device 106 may be a UE device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively: directly or indirectly) to one or more antennas, such as antennas 335a, 335b, and 336 as shown. In some aspects, cellular communication circuitry 330 may include dedicated receive chains (including and/or coupled to (e.g., communicatively: directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, and the like) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
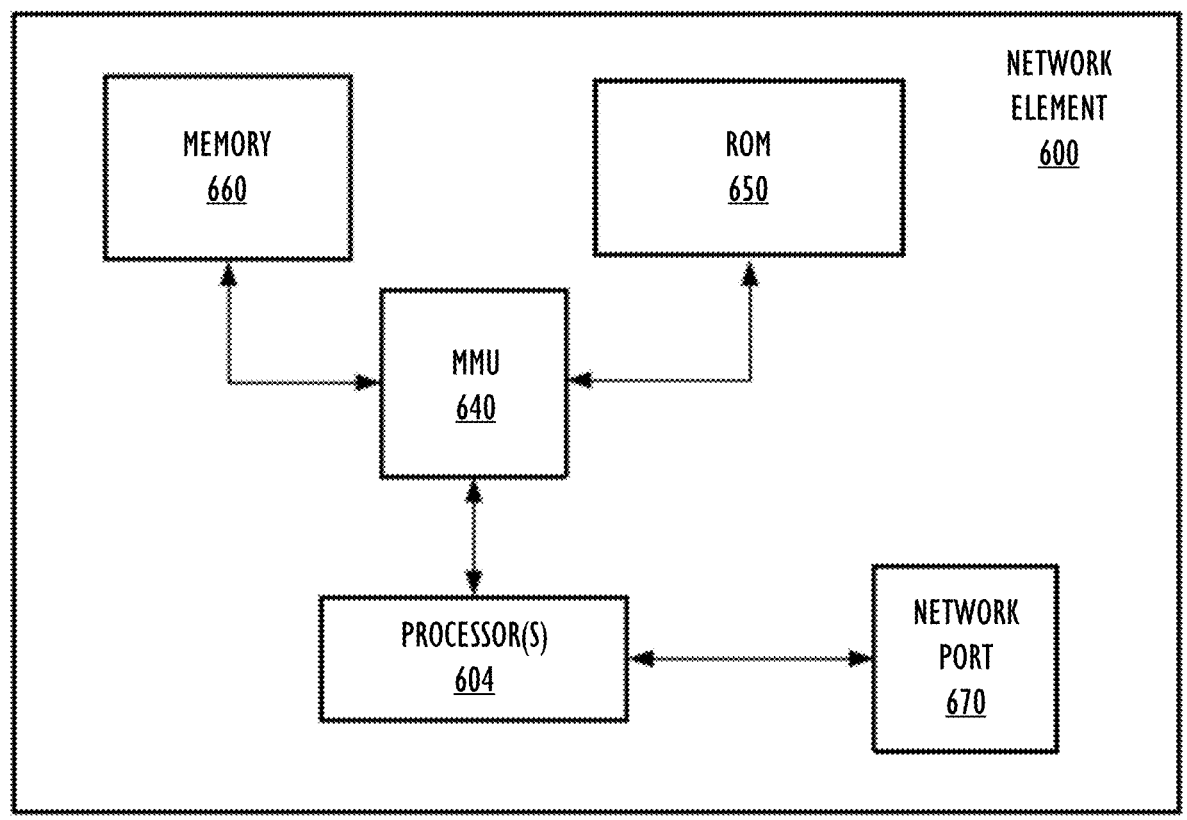
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, and the like. It is noted that the network element 600 of FIG. 6 is a non-limiting example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as a Field Programmable Gate Array (FPGA), or as an Application Specific Integrated Circuit (ASIC), or a combination thereof.

Measurement Configuration Types for Different RATs

A time duration during which the terminal suspends communications with a serving cell to measure an inter-frequency neighbor or other RAT neighbor is known as the MG. As mentioned above, terminals, base stations, and methods described herein provide techniques for transforming MG configurations/measurement configurations between a legacy configuration type and a new configuration type. The legacy configuration type and the new configuration type may be different measurement configurations for component carriers or cells in different RATs. The legacy configuration type and the new configuration type may be different measurement configurations for component carriers or cells in a same RAT. In any RAT, the measurement configuration may include at least one measurement length (e.g., Measurement Gap Length (MGL) in Release 16 of the 3GPP standard) to identify a duration of the MG. The legacy configuration type may be any measurement configuration that is currently set up in a terminal. The new configuration type may be any measurement configuration that is set up to replace the legacy configuration type in the terminal.

In an LTE/LTE-A network, the measurement configuration may include a fixed measurement length to allow at least one synchronization signals (e.g., primary synchronization signal (PSS), secondary synchronization signal (SSS)) to be included within any one gap. In some embodiments, LTE synchronization signals are transmitted at a periodicity of 5 milliseconds (ms). The MGL of LTE may be 6 ms, allowing 0.5 ms for radiofrequency (RF) module re-tuning at the beginning and end of the MG. Using this MGL, the terminal communicating with an LTE network detects the synchronization signal within the MG, identifies a Physical Cell ID (PCI) and a reception timing for the cell being measured, and performs gap measurements using one or more Cell-specific Reference Signals (CRSs).

In an NR network, the measurement configuration may include variable MGLs and one or more measurement gap repetition periods (MGRPs) (i.e., one or more periodicities). The MGLs may be predefined to be equal to 1.5 ms, 3 ms, 3.5 ms, 4 ms, 5.5 ms, and/or 6 ms. The MGRPs may be predefined to be equal to 20 ms, 40 ms, 80 ms, and/or 160 ms.

Measurement Configuration Types in NR

In 5G NR, there are at least three different measurement configuration types. In particular, there are two frequency-centric configuration types (i.e., per-FR1 measurement configuration and per-FR2 measurement configuration) and one device-centric configuration type (i.e., per-UE measurement configuration). The two frequency-centric configuration types allow the terminal to only perform measurements in cells configured with a corresponding frequency ranges FR1 or FR2. The one device-centric configuration type allows the terminal to perform measurements in all cells irrespective of their corresponding frequencies. These configuration types may be mutually exclusive preventing the terminal from being configured with two or more configuration types simultaneously.

In one or more embodiments the measurement configuration is set up using Radio Resource Control (RRC) messaging. According to Releases 15 and 16 of the 3GPP standards, the RRC messaging may be an RRC (Re)configuration message including an information element (IE) called MeasGapConfig within the IE called MeasConfig. In LTE and NR networks, MeasGapConfig includes a first part that specifies control setup/release of the MG and a second part that specifies measurement gap configuration and controls the setup/release.

Setting Up the Measurement Configuration

In NR networks, the RRC (Re)configuration message may be responsible for configuring the terminal with either per-UE or per-FR1 measurement configurations in NR standalone operation (i.e., with a single carrier, NR-Carrier Aggregation (CA) and NR-Dual Connectivity (DC)) or in NR E-UTRA (NE)-DC configuration. Alternatively, the RRC (Re)configuration message may be responsible for configuring the terminal with per-FR2 configuration in any configuration (i.e., NR standalone operation, E-UTRAN NR (EN)-DC, or NE-DC).

The RRC (Re)configuration message may establish a measurement gap pattern associated with an MGL and an MGRP, a measurement gap timing advance (MGTA), a gap offset of the gap pattern, and the parameter refServCellIndicator. The measurement gap pattern is characterized by MGRP and MGL.

There are 24 gap pattern configurations defined in 38.133 to accommodate all the needs for existing NR and E-UTRAN measurements. In a case when the measurement gap is configured by NR RRC messaging, the measurement configuration provides all the required fields (i.e., MGL, MGRP, MGTA, and the gap offset of the gap pattern) in order for the terminal to calculate the MG.

The MGL is the length of measurement gap in ms. Measurement gap lengths of 1.5 ms, 3 ms, 3.5 ms, 4 ms, 5.5 ms, and 6 ms are defined in NR.

The MGRP is the periodicity (in ms) at which measurement gap repeats. Periodicities of 20 ms, 40 ms, 80 ms, and 160 ms are defined in NR.

The MGTA is timing advance for the MG. If this parameter is configured, the terminal starts the measurement MGTA ms before a gap subframe occurrence. For example, the MG starts at time MGTA ms advanced to an end of the latest subframe occurring immediately before the MG. The amount of timing advance may be 0.25 ms for FR2 or 0.5 ms for FR1.

The gap offset of the gap pattern is a value with a range from 0 to MGRP-1. For example, if the periodicity is 40 ms, the offset ranges from 0 ms to 39 ms.

The parameter refServCellIndicator indicates the serving cells whose single-frequency network (SFN) and subframe are used for gap calculation for a given gap pattern.

In the case of EN-DC configuration, E-UTRAN RRC messaging is responsible for configuring the terminal with measurement gap using the parameter MeasGapConfig in E-UTRAN RRC. This is applicable for LTE and NR serving cells on FR1 only.

In some embodiments, the RRC (Re)configuration message relies on a terminal capability to determine an appropriate set up for the measurement configuration. The terminal capability may be provided from the terminal using the parameter UECapability to convey the terminal's measurement capabilities for standalone NR and NR-DC. The terminal capability may include one or more indication parameters corresponding to a focus for processing measurement configurations. These indication parameters may be an indication of a per-user equipment (UE) ability, an indication of a per-frequency range (FR) ability, an indication of a per-component carrier (CC) ability, an indication of a per-bandwidth part (BWP) ability, and/or an indication of a per-band or per-band combination ability.

Examples Including Measurement Configuration Types

In one or more embodiments, a legacy measurement configuration is a legacy MG and a new measurement configuration is one of a pre-configured MG, a network controlled small gap (NCSG), and multiple concurrent and independent MG patterns. The new measurement configuration may be a new measurement gap configuration that applies to all serving cells in a predefined frequency range. The terminal, the base station, and the method describe new mechanisms to allow for the transformation between the legacy MG and the Pre-configured MG Pattern or "Pre-MG" or between the legacy MG and the NCSG.

Pre-Configured MG ("Pre-MG") Measurement Configuration

The Pre-MG includes pre-configured measurement configuration patterns for implementing the MG. These measurement configuration patterns are indicated by a table during the establishment of a communication link between the terminal and the base station. In some embodiments, the patterns used in Pre-MG may be set up to follow a new set of patterns configured through higher layer signaling. Further, the patterns used in Pre-MG may be gap pattern configurations currently described in Release 16 of the 3GPP standards. These patterns are twenty-six different patterns (numbers from 0 through 25) referenced in TABLE 1.

TABLE 1

| Gap Pattern Id | Measurement Gap Length (MGL, ms) | Measurement Gap Repetition Period (MGRP, ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |

TABLE 1-continued

| Gap Pattern Id | Measurement Gap Length (MGL, ms) | Measurement Gap Repetition Period (MGRP, ms) |
|---|---|---|
| 21 | 1.5 | 40 |
| 22 | 1.5 | 80 |
| 23 | 1.5 | 160 |
| 24 | 10 | 80 |
| 25 | 20 | 160 |

Figure 7A:
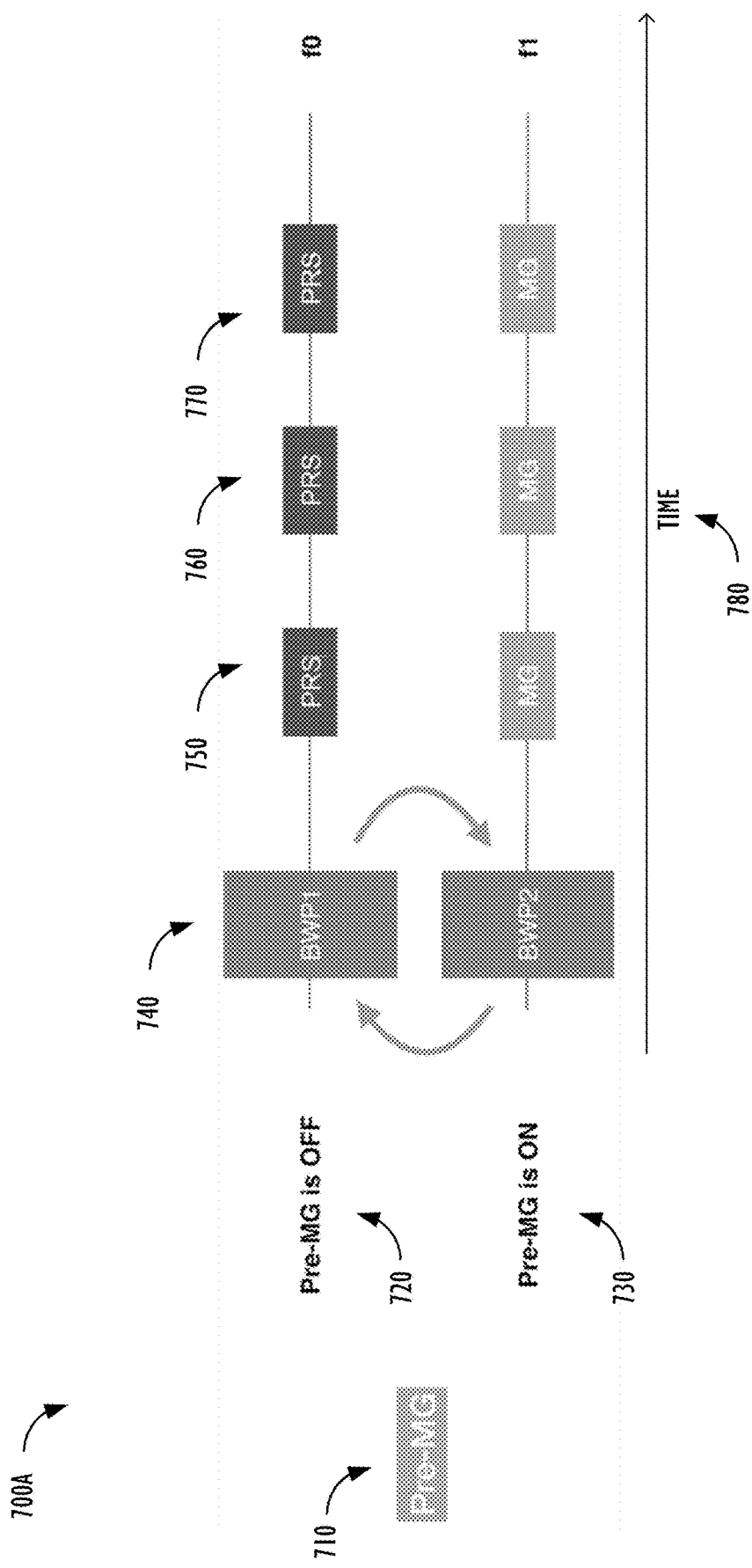
FIGS. 7A and 7B illustrate transmission sequences, according to some aspects.
Figure 7B:
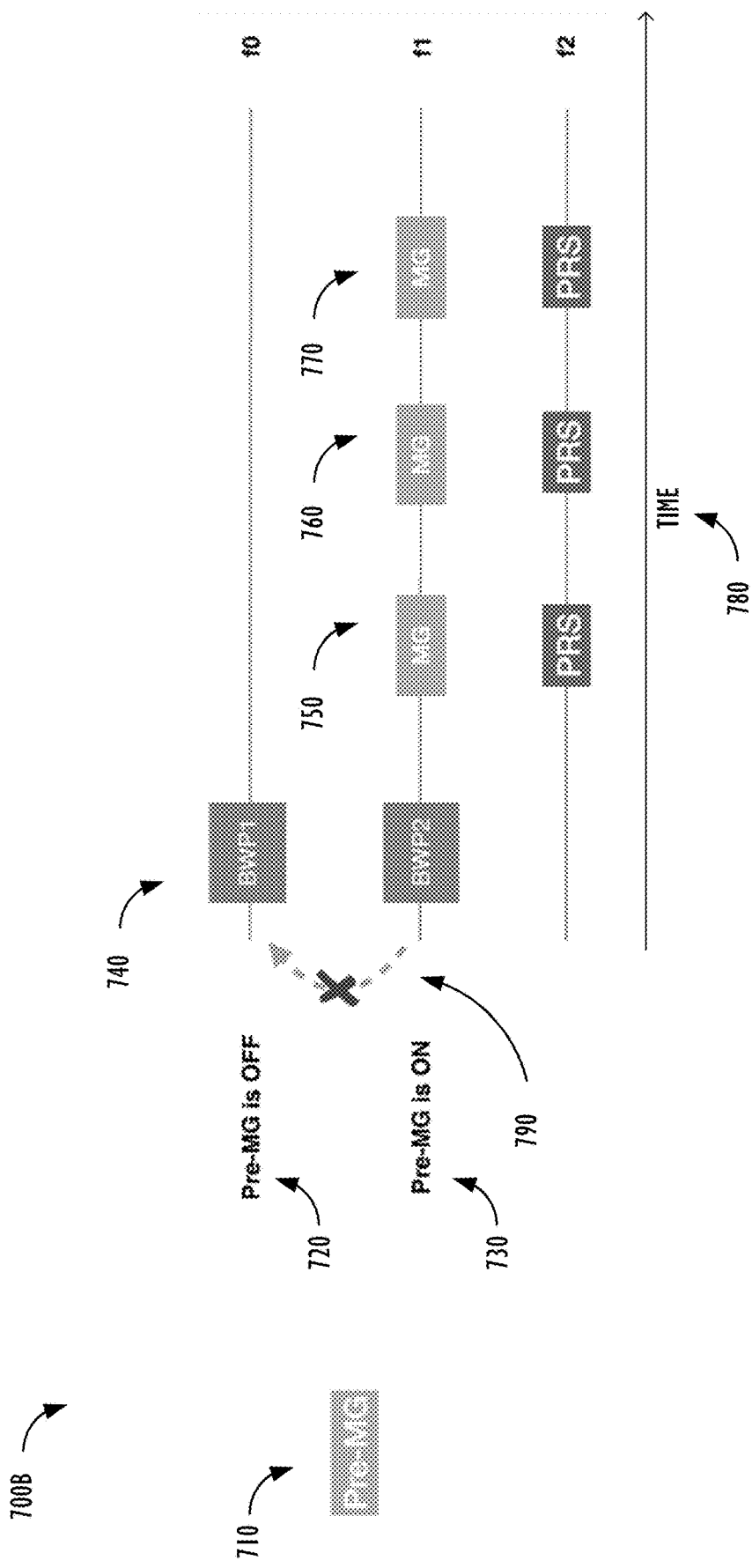

FIGS. 7A and 7B show illustrations of a process for attempting a measurement reconfiguration in accordance to one or more embodiments.

FIG. 7A shows a sequence 700A with the Pre-MG being implemented in a terminal as a first configuration type 710 in accordance to one or more embodiments. The sequence 700A includes a BWP slot 740, instance 750, instance 760, and instance 770 along a time frame 780. The BWP slot 740 includes a BWP1 centered at a first frequency f0 and a BWP2 centered at a second d frequency f1. Instances 750, 760, and 770 correspond to MGs set for positioning reference signals (PRSs). In FIG. 7A, the reconfiguration of the measurement configuration for this terminal switches the status of the first configuration type between an OFF state 720 and an ON state 730. The reconfiguration requires high accuracy when measurement is configured for PRS instances. Further, the sequence 700A receives an activation/deactivation status indication per BWP through the RRC messaging. As a result, the excess time may cause the MG to detach when the terminal performs the PRS if the network finds it difficult to switch between BWP1 and BWP 2 over the time frame 780.

In FIG. 7B, a sequence 700B may be similar to sequence 700A. Further, the Pre-MG may be configured per-UE or per-FR and signaled through RRC messaging. The Pre-MGs may be additionally configured per BWP. In some embodiments, common configuration parameters between legacy MG and Pre-MG may be configured in a same manner. In one or more embodiments, the Pre-MG may be configured for PRS measurements. The exact configuration of Pre-MG used for PRS may be configured for the specific application. In one or more embodiments, Pre-MG can be used for PRS/CSI-RS based on an inter-frequency L3 measurement. NR PRS was introduced in Release 16 of the 3GPP standard. PRS is assumed to be always measured within the MG, since a PRS measurement requires a large number of baseband resources. In this case, the terminal is not required to simultaneously perform PRS measurement and serving cell data Rx/Tx. As a result, problem 790 occurs when the network is not capable of switching DL BWPs to deactivate the Pre-MG when the terminal is configured with a PRS measurement. A similar problem 790 exists when Pre-MG is used for CSI-RS based inter-frequency measurements, since inter-frequency CSI-RS L3 measurement is always expected to be performed with MG. In particular, taking PRS measurement as an example, the network cannot switch to the BWP where the Pre-MG is OFF when the terminal is doing PRS measurement or CSI-RS based inter-frequency L3 measurement.

Network Controlled Small Gap ("NCSG") Measurement Configuration

In configuring an NCSG, terminal may reconfigure a receiver bandwidth, carrier frequency, or turn ON/OFF one of various RF chains when performing measurements on a Primary Cell (PCell) under a Master Cell Group (MCG), an activated Secondary Cell (SCell)/Primary SCell (PSCell) that may be under a Secondary Cell Group (SCG), deactivated SCell and/or an unused RF chain. This process may cause interruptions on the PCell, any activated SCell(s), or both. This measurement configuration type is capable of performing automated interruptions while identifying and measuring inter-frequency and/or inter-RAT cells without gaps. A length and pattern for the interruptions may be based on one or more numerologies and/or subcarrier spacing (SCS) parameters configured for the terminal. In some embodiments, the patterns used in NCSG may be set up to follow a new set of patterns configured through higher layer signaling. Further, the patterns used in NCSG may be gap pattern configurations currently described in Release 16 of the 3GPP standards. These patterns may be set up following Physical Downlink Control Channel (PDCCH) transmission parameters for out-of-sync transmissions.

Figure 8A:
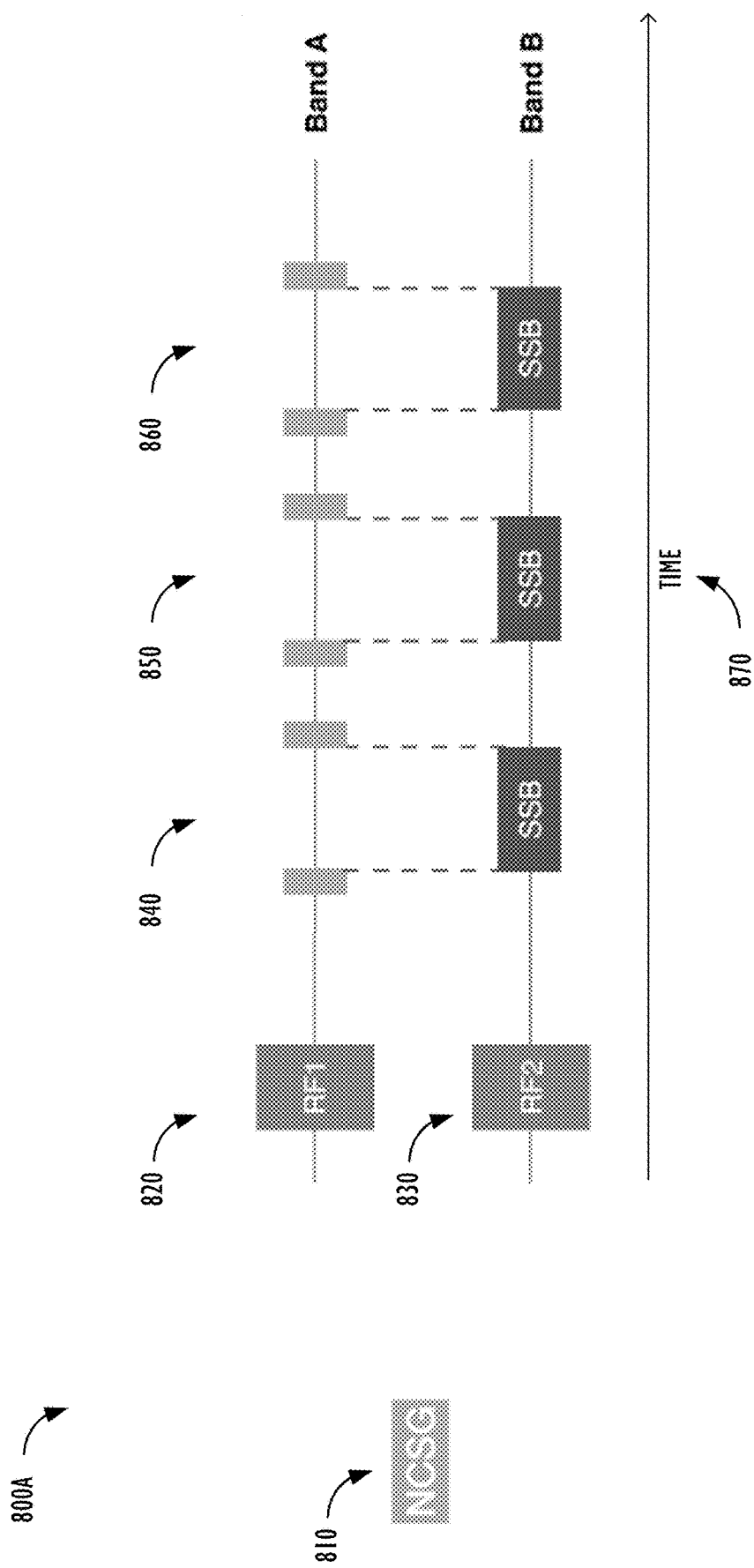
FIGS. 8A and 8B illustrate transmission sequences, according to some aspects.
Figure 8B:
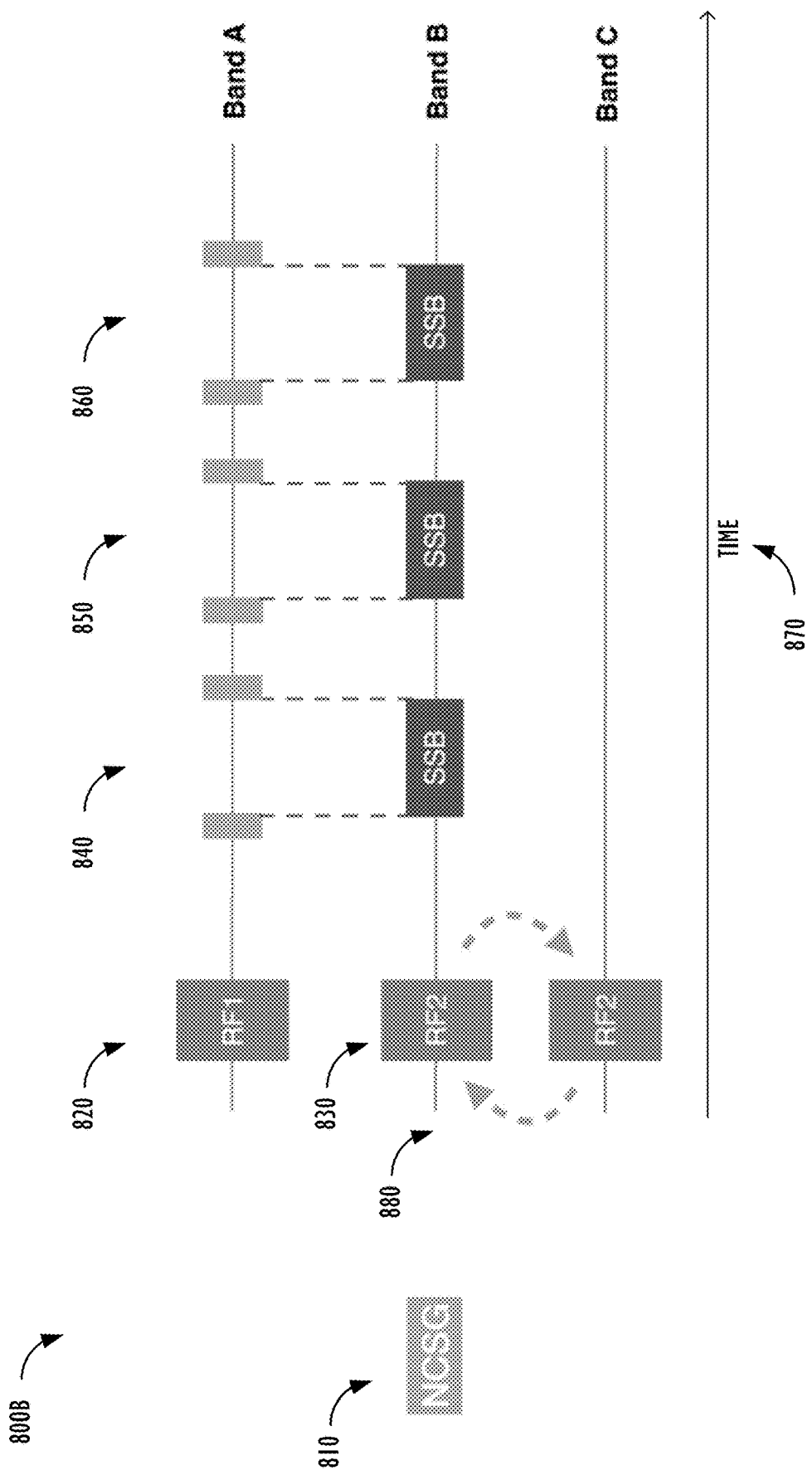

FIGS. 8A and 8B show illustrations of a process for performing a measurement reconfiguration in accordance to one or more embodiments.

FIG. 8A shows a sequence 800A with the NCSG being implemented in a terminal as a second configuration type 810 in accordance to one or more embodiments. The sequence 800A includes an RF1 slot 820 and an RF2 slot 830 positioned at a Band A and a Band B, respectively. The RF1 slot 820 and the RF2 slot 830 are aligned with instances 840, instance 850, and instance 860 along a time frame 870. In instances 840, 850, and 860, RF1 includes multiple measurement gaps is aligned with the start and the end of corresponding synchronization signal blocks (SSBs) in RF2. In FIG. 8A, the terminal may measure target frequency layer using spare RF chain, without using legacy MG.

In FIG. 8B, a sequence 800B may be similar to sequence 800A. In sequence 800A, NCSG is configured via RRC signaling. However, availability of the RF chain can be more dynamically changed via Medium Access Control (MAC) signaling. For example, an SCell may be activated/deactivated via a MAC Control Element (CE) message. Assuming that the SCell is on Band B, once the SCell is activated, the terminal may fix RF2 on Band B for SCell data Rx/Tx. However, at this point, the terminal may not use RF2 for measuring Band C with NCSG. The terminal may use RF2 for measuring Band C with NCSG once the SCell is deactivated and RF2 becomes spare. In sequence 800B, problem 880 is that NCSG can only be (de)configured via RRC, while the availability of spare RF chain can be more dynamically changes.

Transforming a Measurement Configuration Between a Legacy Configuration Type and a New Configuration Type In view of problems 790 and 880, on or more embodiments aim to transform the measurement configuration of a terminal between a legacy configuration type and a new configuration type. In a case where the terminal transforms between two configuration types, the terminal reconfigures a MG at a faster speed when compared to reconfiguring using an existing measurement configuration. In some embodiments, this is a result of the terminal not needing to reconfigure the MG through the RRC messaging during activation and deactivation of the measured cell. Instead, the legacy measurement configuration is transformed into the new measurement configuration giving the terminal access to additional configuration messaging types. In some embodiments, the new measurement configurations are Pre-MG or NCSG.

Transforming a Measurement Configuration Between a Legacy MG Configuration and a Pre-MG Configuration In one or more embodiments, transforming an MG configuration between a legacy MG configuration and a Pre-MG configuration includes reporting a specific measurement configuration support from the terminal to a base station. For the transformation to take place, the terminal may communicate a terminal capability indicating support of transformation between the legacy MG configuration and the Pre-MG configuration. Once the terminal capability is received, the base station may obtain network configuration information including a configured Pre-MG configuration, including a Pre-MG pattern and activation/deactivation statuses for each associated BWP. Further, the network configuration information may include a mapping between the Pre-MG configuration and the legacy MG configuration for transformation. In some embodiments, the mapping may be a fixed mapping between the Pre-MG configuration and the legacy MG configuration according to a predefined reference table.

Once the network configuration information is obtained, the base station may send a first indication including the network configuration information to the terminal to transform the Pre-MG configuration to the legacy MG configuration, due to (but not limited to) identifying a finished PRS- or CSI-RS-based inter-frequency L3 measurement. At this point, the base station may send a second indication to the terminal to transform the legacy MG configuration to the Pre-MG configuration (e.g., after the PRS- and CSI-RS-based inter-frequency L3 measurement is finished). In some embodiments, the network configuration information indicates to first configure the legacy MG configuration if there is a PRS- or CSI-RS-based inter-frequency L3 measurement. Afterwards, the network configuration information may indicate to transform that legacy MG configuration to the Pre-MG configuration once the measurements are finished.

In one or more embodiments, the terminal capability includes a value indicating support of transformation between the Pre-MG configuration and the legacy MG configuration. The terminal capability may be indicated per-UE, per-FR, or per-band control (BC), depending on a support indicator type for the Pre-MG configuration. In these embodiments, the network only triggers, via the base station, gap transformation for the terminal which indicates the support of transformation as described above.

In one or more embodiments, the network configuration information is a MAC CE message, a DCI message, or an RRC message.

In some embodiments, the network configuration information indicates the transformation to the terminal using an enumerated variable (e.g., {Pre-MG, legacy MG}). If "Pre-MG" is indicated in this enumerated variable, then the MG configuration is used as Pre-MG configuration (i.e., the terminal activates/deactivates the MG following the ON/OFF status configured associated with the active BWP). Correspondingly, RRM requirements defined for Pre-MG configuration may apply. If "legacy MG" is indicated, the MG is used as legacy MG configuration (i.e., the terminal will ignore the ON/OFF indication associated with the active BWP). Correspondingly, legacy RRM requirements for legacy MG configuration may apply.

In some embodiments, the network configuration information indicates the transformation to the terminal using a Boolean variable. If the MG configuration is configured as Pre-MG configuration in RRC (Re)configuration, the terminal may transform Pre-MG configuration to the legacy MG configuration once the new indication is received, and vice versa.

In one or more embodiments, the network provides, via the base station, the mapping between Pre-MG configuration and legacy MG configuration for transformation. Alternatively, the mapping may be accessed by the terminal using predefined representative one-to-one values corresponding to one or more tables saved in memory. In some embodiments, these tables may include Table 1 and other MG pattern tables developed to comply with the 3GPP standards.

Transforming a Measurement Configuration Between a Legacy MG Configuration and a NCSG Configuration In one or more embodiments, transforming an MG configuration between a legacy MG configuration and a NCSG configuration includes reporting a specific measurement configuration support from the terminal to a base station. For the transformation to take place, the terminal may communicate a terminal capability indicating support of transformation between the legacy MG configuration and the NCSG configuration. Once the terminal capability is received, the base station may obtain network configuration information including a configured NCSG configuration. Further, the network configuration information may include a mapping between the NCSG configuration and the legacy MG configuration for transformation. In some embodiments, the mapping may be a fixed mapping between the NCSG configuration and the legacy MG configuration according to a predefined reference table.

Once the network configuration information is obtained, the base station may send a first indication including the network configuration information to the terminal to transform the NCSG configuration to the legacy MG configuration, due to (but not limited to) identifying an availability change for a spare RF chain. The spare RF chain may result from the activation of a SCell. At this point, the base station may send a second indication to the terminal to transform the legacy MG configuration to the NCSG configuration (e.g., after identifying an availability change of spare RF chain). In some embodiments, the network configuration information indicates to first configure the legacy MG configuration if the SCell is active and there is no spare RF chain. Afterwards, the network configuration information may indicate to transform that legacy MG configuration to the NCSG once the SCell is deactivated.

In one or more embodiments, the terminal capability includes a value indicating support of transformation between the NCSG configuration and the legacy MG configuration. The terminal capability may be indicated per-UE, per-FR, or per-BC, depending on a support indicator type for the NCSG configuration. In these embodiments, the network only triggers, via the base station, gap transformation for the terminal which indicates the support of transformation as described above.

In one or more embodiments, the network configuration information is a MAC CE message, a DCI message, or an RRC message.

In some embodiments, the network configuration information indicates the transformation to the terminal using an enumerated variable (e.g., {NCSG, legacy MG}). If "NCSG" is indicated in this enumerated variable, then the MG configuration is used as NCSG configuration (i.e., the terminal will use the spare RF chain for measuring other frequency layers). Correspondingly, RRM requirements defined for NCSG configuration may apply. At this point, the terminal may only cause interruptions at the beginning and the end of the windows for measurement. If "legacy MG" is indicated, the MG is used as legacy MG configuration. Correspondingly, legacy RRM requirements for legacy MG configuration may apply.

In some embodiments, the network configuration information indicates the transformation to the terminal using a Boolean variable. If the MG configuration is configured as NCSG configuration in RRC (Re)configuration, the terminal may transform NCSG configuration to the legacy MG configuration once the new indication is received, and vice versa.

Figure 9:
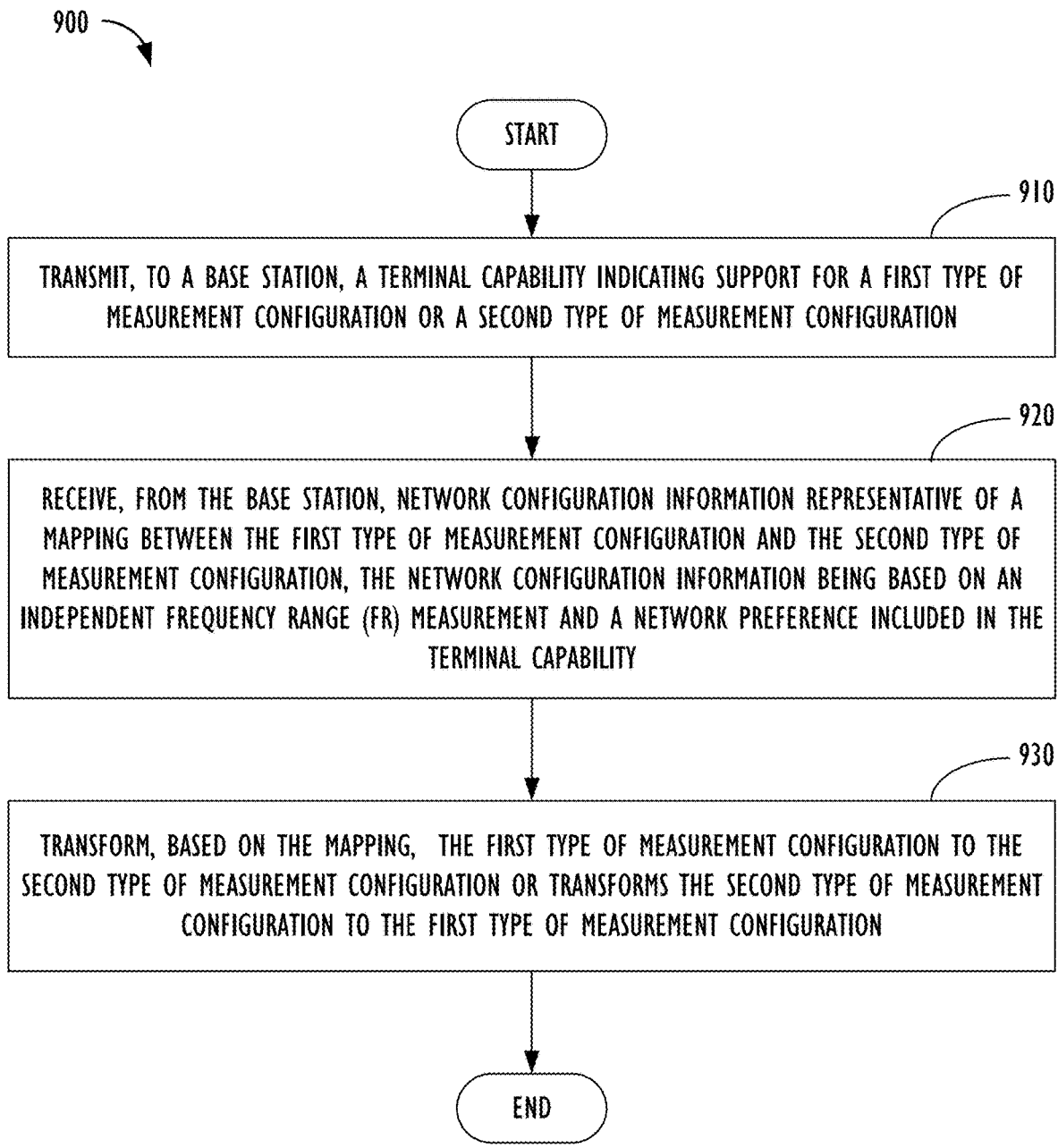
FIGS. 9 and 10 are flowcharts detailing methods of transforming a measurement configuration for a wireless device, according to some aspects.

In one or more embodiments, the network provides, via the base station, the mapping between NCSG configuration and legacy MG configuration for transformation. Alternatively, the mapping may be accessed by the terminal using predefined representative one-to-one values corresponding to one or more tables saved in memory. In some embodiments, these tables may include Table 1 and other MG pattern tables developed to comply with the 3GPP standards.
Exemplary Methods for Transforming the Measurement Configuration Turning to FIG. 9, a flowchart 900 is shown, detailing a method of transforming a measurement configuration between two measurement configuration types in accordance to one or more embodiments. The method is executed by the terminal that performs the configured measurement. At 910, the flowchart begins with the terminal transmitting, to a base station, a terminal capability indicating support for a first type of measurement configuration or a new measurement configuration. The terminal provides a terminal-based information element, such as a UE Capability information element. At 920, the flowchart continues with the terminal receiving, from the base station, network configuration information representative of a mapping between the first type of measurement configuration and the new measurement configuration. The network configuration information is based on an independent frequency range (FR) measurement and a network preference included in the terminal capability. At 930, the flowchart ends with the terminal transforming, based on the mapping, the first type of measurement configuration to the new measurement configuration or transforms the new measurement configuration to the first type of measurement configuration.

Figure 10:
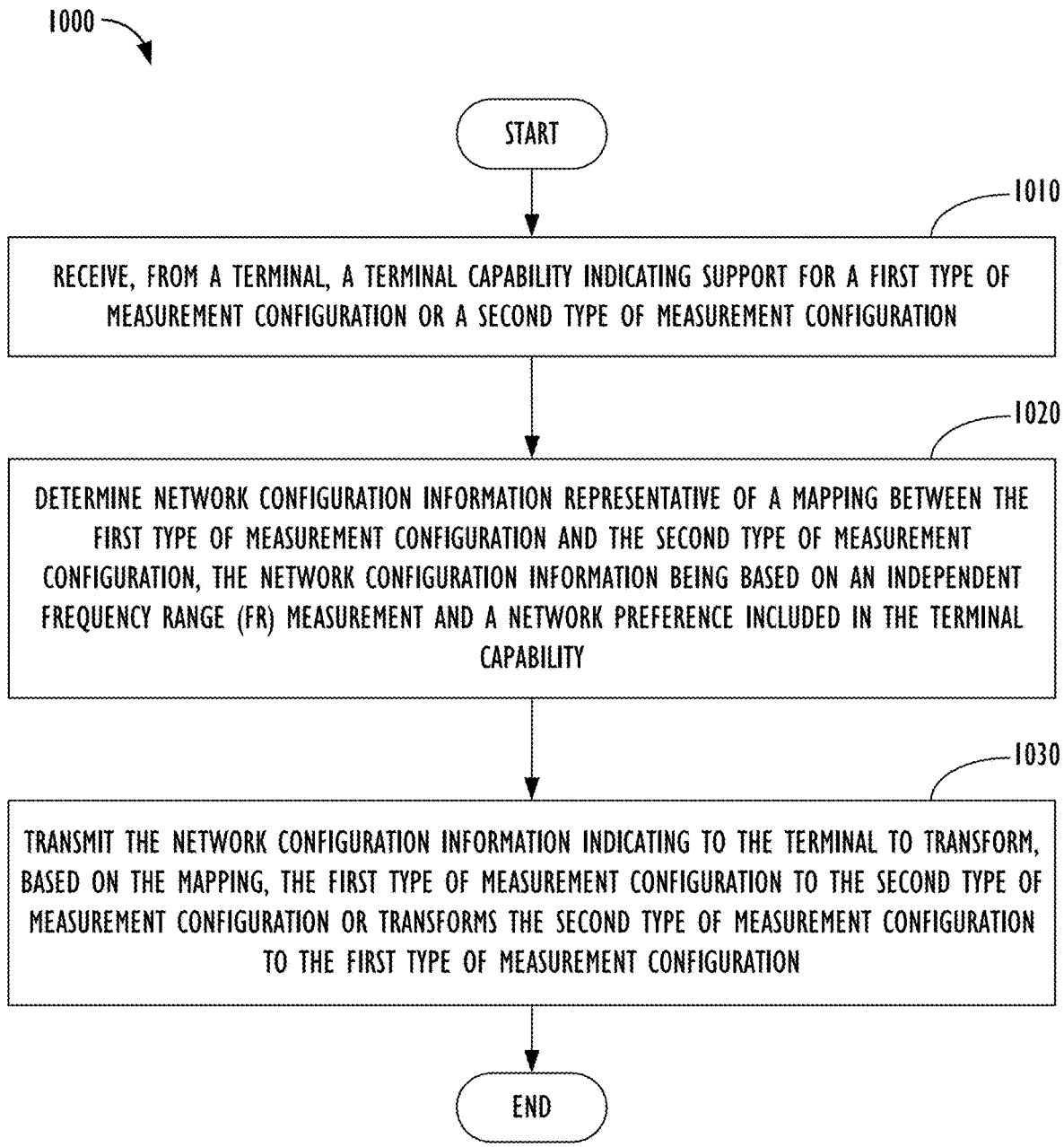

Turning to FIG. 10, a flowchart 1000 is shown, detailing a method of transforming a measurement configuration between two measurement configuration types in accordance to one or more embodiments. The method is executed by the base station that connects the terminal performing the measurement to the network. At 1010, the flowchart begins with the base station receiving, from the terminal, a terminal capability indicating support for a first type of measurement configuration or a new measurement configuration. The terminal provides a terminal-based information element, such as a UE Capability information element. At 1020, the flowchart continues with the base station determining network configuration information representative of a mapping between the first type of measurement configuration and the new measurement configuration. The network configuration information is based on an independent frequency range (FR) measurement and a network preference included in the terminal capability. At 1030, the flowchart ends with the terminal transmitting the network configuration information indicating to the terminal to transform based on the mapping, the first type of measurement configuration to the new measurement configuration or transforms the new measurement configuration to the first type of measurement configuration.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method (e.g., any of a method aspects described herein, or, any combination of the method aspects described herein, or, any subset of any of the method aspects described herein, or, any combination of such subsets).

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A terminal comprising:
a transmitter that transmits, to a base station, a terminal capability indicating support for changing between a legacy measurement configuration and a second type of measurement configuration;
a receiver that receives, from the base station, network configuration information representative of a mapping between the legacy measurement configuration and the second type of measurement configuration, wherein the receiver receives from the base station an indication to change the measurement configuration based on a position referencing signal measurement or a channel state information reference signal based inter-frequency L3 measurement; and
a processor that, based on the mapping, changes the legacy measurement configuration to the second type of measurement configuration or changes the second type of measurement configuration to the legacy measurement configuration,
wherein the network configuration information is based on an independent frequency range (FR) measurement and a network preference included in the terminal capability.

2. The terminal of claim 1, wherein the terminal capability comprises at least one of the following:
(a) an indication of a per-user equipment (UE) ability;
(b) an indication of a per-frequency range (FR) ability;
(c) an indication of a per-component carrier (CC) ability;
(d) an indication of a per-bandwidth part (BWP) ability;

(e) an indication of a per-band or per-band combination ability; or (f) a combination of any of (a)-(e), above.

3. The terminal of claim 1, wherein the second type of measurement configuration is a new measurement gap configuration that applies to all serving cells neighboring the terminal.

4. The terminal of claim 1, wherein the second type of measurement configuration is a new measurement gap configuration that applies to all serving cells in a predefined frequency range.

5. The terminal of claim 1, wherein the network configuration information is determined based on a reference signal information associated with higher layer signaling.

6. The terminal of claim 1, wherein the network configuration information comprises at least one of the following:

(a) a Medium Access Control (MAC) Control Element (CE) message;

(b) a Downlink Control Information (DCI) message; or (c) a radio resource control (RRC) message.

7. The terminal of claim 1, wherein the network configuration information indicates the mapping in an enumerated variable or a Boolean variable.

8. A base station comprising:

a receiver that receives, from a terminal, a terminal capability indicating support for a legacy measurement configuration or a second type of measurement configuration;

a processor that determines network configuration information representative of a mapping between the legacy measurement configuration and the second type of measurement configuration;

a transmitter that transmits, to the terminal, the network configuration information and an indication to the terminal to change, based on the mapping, the legacy measurement configuration to the second type of measurement configuration or to change the second type of measurement configuration to the legacy measurement configuration based on a position referencing signal measurement or a channel state information reference signal based inter-frequency L3 measurement, wherein the network configuration information is based on an independent frequency range (FR) measurement and a network preference included in the terminal capability.

9. The base station of claim 8, wherein the terminal capability comprises at least one of the following:

(a) an indication of a per-user equipment (UE) ability;

(b) an indication of a per-frequency range (FR) ability;

(c) an indication of a per-component carrier (CC) ability;

(d) an indication of a per-bandwidth part (BWP) ability;

(e) an indication of a per-band or per-band combination ability; or (f) a combination of any of (a)-(e), above.

10. The base station of claim 8, wherein the second type of measurement configuration is a new measurement gap configuration that applies to all serving cells neighboring the terminal.

11. The base station of claim 8, wherein the second type of measurement configuration is a new measurement gap configuration that applies to all serving cells in a predefined frequency range.

12. The base station of claim 8, wherein the network configuration information is determined based on a reference signal information associated with higher layer signaling.

13. The base station of claim 8, wherein the network configuration information comprises at least one of the following:

(a) a Medium Access Control (MAC) Control Element (CE) message;

(b) a Downlink Control Information (DCI) message; or (c) a radio resource control (RRC) message.

14. The base station of claim 8, wherein the network configuration information indicates the mapping in an enumerated variable or a Boolean variable.

15. A method comprising:

transmitting, from a terminal to a base station, a terminal capability indicating support for a legacy measurement configuration or a second type of measurement configuration;

receiving, in the terminal from the base station, network configuration information representative of a mapping between the legacy measurement configuration and the second type of measurement configuration, wherein the terminal receives from the base station an indication to change the measurement configuration based on a position referencing signal measurement or a channel state information reference signal based inter-frequency L3 measurement; and changing, based on the mapping, the legacy measurement configuration to the second type of measurement configuration or transforms changes the second type of measurement configuration to the legacy measurement configuration, wherein the network configuration information is based on an independent frequency range (FR) measurement and a network preference included in the terminal capability.

16. The method of claim 15, wherein the terminal capability comprises at least one of the following:

(a) an indication of a per-user equipment (UE) ability;

(b) an indication of a per-frequency range (FR) ability;

(c) an indication of a per-component carrier (CC) ability;

(d) an indication of a per-bandwidth part (BWP) ability;

(e) an indication of a per-band or per-band combination ability; or (f) a combination of any of (a)-(e), above.

17. The method of claim 15, wherein the second type of measurement configuration is a new measurement gap configuration that applies to all serving cells neighboring the terminal.

18. The method of claim 15, wherein the second type of measurement configuration is a new measurement gap configuration that applies to all serving cells in a predefined frequency range.

19. The method of claim 15, wherein the network configuration information is determined based on a reference signal information associated with higher layer signaling.

20. The method of claim 15, wherein the network configuration information comprises at least one of the following:

(a) a Medium Access Control (MAC) Control Element (CE) message;

(b) a Downlink Control Information (DCI) message; or (c) a radio resource control (RRC) message.

* * * * *

UNITED STATES PATENT AND TRADEMARK OFFICE
CERTIFICATE OF CORRECTION

PATENT NO. : 12,382,323 B2
APPLICATION NO. : 17/906707
DATED : August 5, 2025
INVENTOR(S) : Qiming Li et al.

Page 1 of 1

It is certified that error appears in the above-identified patent and that said Letters Patent is hereby corrected as shown below:

In the Claims

Claim 15, Column 26, Line 30: delete the word "transforms" after -- or --

Signed and Sealed this
Second Day of September, 2025

Coke Morgan Stewart
*Acting Director of the United States Patent and Trademark Office*